H. M. HEIMERDINGER.
METHOD OF PRODUCING A FOOD PRODUCT.
APPLICATION FILED JAN. 17, 1919.
1,295,162.
Patented Feb. 25, 1919.
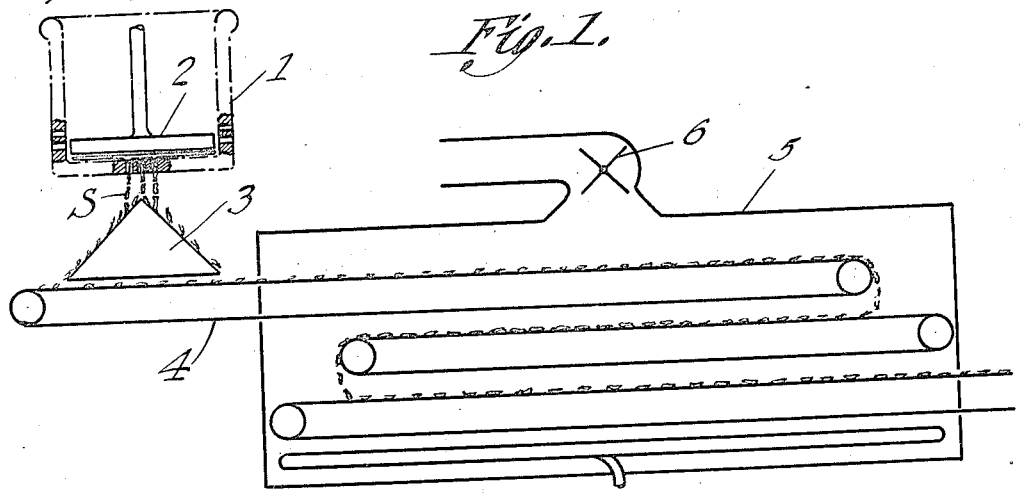
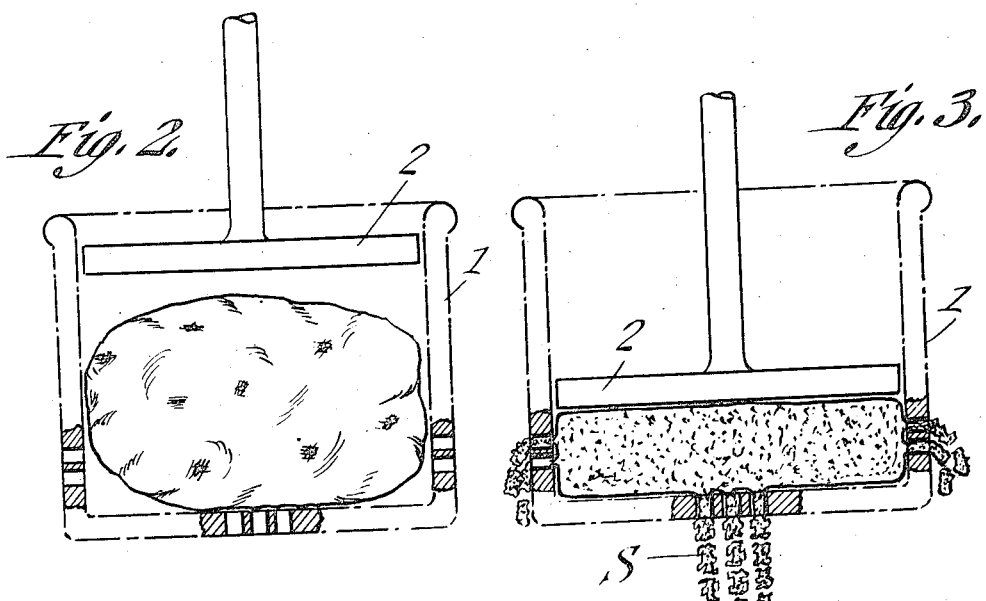
H. M. Heimerdinger
Inventor
By [signature]
Attorneys

UNITED STATES PATENT OFFICE.

HARRY M. HEIMERDINGER, OF BLACKFOOT, IDAHO.

METHOD OF PRODUCING A FOOD PRODUCT.

1,295,162.

Specification of Letters Patent.   Patented Feb. 25, 1919.

Application filed January 17, 1919.   Serial No. 271,707.

*To all whom it may concern:*

Be it known that I, HARRY M. HEIMERDINGER, a citizen of the United States, residing at Blackfoot, in the county of Bingham and State of Idaho, have invented a new and useful Method of Producing a Food Product, of which the following is a specification.

This invention relates to a method of producing a food product in the form of grains of crystallized vegetable matter, one of its objects being to provide means whereby after the starch and albumen in the vegetable cells have been set by heat, the water cells are ruptured without compressing them and the moisture contained therein is taken off through the open mouths of the cells, thereby expediting the drying of the product and leaving it in a hard, brittle, crystalline form. A further object is to utilize a step in the method whereby the essential vitamens of the food are preserved in the product and whereby complete separation of the pulp from all fibrous and extraneous matter is effected, with the result that the product is pure and clean and contains all the constituents of the unpeeled, cooked food.

With the foregoing and other objects in view, which will appear as the description proceeds, the invention consists of certain novel steps in the method which will be hereinafter more fully described and pointed out in the claims, it being understood that various changes may be made in the said method without departing from the spirit or sacrificing any of the advantages of the invention as set forth in the claims.

In the accompanying drawings has been shown one form of apparatus whereby the method can be carried out.

In said drawings—

Figure 1 is a view showing, in diagram, one form of apparatus that may be employed for carrying out the process, said figure showing the final steps of the process.

Fig. 2 is a section through the compressing means and showing the first step of the process of separating the pulp from the skin.

Fig. 3 is a similar view showing an intermediate step.

In carrying out the process potatoes, either sweet or white can be used, or, if desired, the process can be followed in treating other vegetation, such as beans, pumpkins, and other starch containing foods having outer skins which are sufficiently non-resistant to permit the process to be carried on. In the present instance the process described will be that of treating potatoes inasmuch as the invention is of especial importance to the potato growing industry because of the saving of food that can be effected by means of this process.

The potatoes are first washed thoroughly and then boiled under pressure in a sealed receptacle at 212°–220° F. so as to become thoroughly cooked without causing the skins to break. The length of this cooking process depends upon the sizes of the potatoes which must be thoroughly cooked, and this treatment sets the starch and albumen. The cooked potato is removed promptly from the hot water and placed immediately in its heated condition in a receptacle having a large number of small perforations therein, such a receptacle being shown at 1 in the drawings. A plunger is then forced against the potato and will compress it against the perforated surfaces and as the pulp cannot escape past the plunger it is compelled to burst through the single thickness of skin lying between it and the perforations. The rough edges of the skin at the perforations will project into said perforations as shown in Fig. 2 and as the pulp is forced through the openings in the skin and receptacle it will be given a slight lateral pressure by the rough edges of the skin. It has been found, by actual experiment, that this action results in the rupturing of the water cells in the pulp passing through the openings, with the result that the hot moisture contained in the cells will puff through the pulp leaving all of the cells open through the surfaces of the grains of pulp. As these grains S issue from the receptacle 1 under the pressure of the plunger 2 they will fall upon a suitable spreading or distributing cone 3 mounted for rotation and which, in turn, will scatter the grains over a traveling belt 4. This belt will carry the grains into a chamber the temperature of which is slightly below that necessary to brown the product, and from which moisture is exhausted by a fan, said chamber and fan being shown generally at 5 and 6 in Fig. 1. In practice it has been found that about six minutes is required to dry the product, which, on inspection, will be found to be of a crystalline nature and decidedly porous, the mouths of the water cells which had been puffed open by the escaping moisture, leaving the grains with very rough surfaces and exposing the dried cells partly separating the crystals.

An essential step in the process is that of forcing the pulp through a single thickness of the skin as in this way only will the water cells be ruptured and left open so that when the drying step is completed, the product will not be a hard compact mass like vermicelli, but will be a hard but very porous and crystalline structure.

In heating the grains it is intended to leave approximately seven per cent. of the moisture.

The product can be preserved indefinitely but will absorb moisture quickly and evenly when brought into direct contact therewith.

What is claimed is:—

1. The herein described step in the method of producing a food product which consists in placing a boiled, unskinned starchy vegetable such as potato and the like, while hot, in a container having perforations, and in such manner that on the application of pressure the pulp will be forced through a single thickness of skin and into and through the perforations.

2. The herein described method of producing a food product which consists in placing a boiled, unskinned starchy vegetable such as potato and the like, while hot, in a container having perforations and in such manner that on application of pressure the pulp will be forced through a single thickness of skin and into and through the perforations, applying pressure, and then drying.

3. The herein described method of producing a food product which consists in placing a boiled, unskinned starchy vegetable such as potato and the like, while hot, in a container having perforations and in such manner that on application of pressure the pulp will be forced through a single thickness of skin and into and through the perforations in the form of grains, applying pressure to force the pulp through the skin to open the water cells of the grains and release the heated moisture therein, and then drying the grains.

In testimony that I claim the foregoing as my own, I have hereto affixed my signature in the presence of two witnesses.

HARRY M. HEIMERDINGER.

Witnesses:
Ivy E. Simpson,
Agnes Rockelli.